(12) United States Patent
Randall (10) Patent No.: US 12,338,788 B2
(45) Date of Patent: Jun. 24, 2025

(54) WIND TURBINE BLADE

(71) Applicant: Vestas Wind Systems A/S, Aarhus N. (DK)

(72) Inventor: Stephen Randall, Isle Of Wight (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/721,937

(22) PCT Filed: Dec. 20, 2022

(86) PCT No.: PCT/DK2022/050292
§ 371 (c)(1),
(2) Date: Jun. 20, 2024

(87) PCT Pub. No.: WO2023/117012
PCT Pub. Date: Jun. 29, 2023

(65) Prior Publication Data
US 2024/0410332 A1 Dec. 12, 2024

(30) Foreign Application Priority Data
Dec. 21, 2021 (DK) .......................... PA 2021 70649

(51) Int. Cl.
*F03D 1/06* (2006.01)
(52) U.S. Cl.
CPC ........ *F03D 1/0681* (2023.08); *F05B 2250/13* (2013.01); *F05B 2280/6003* (2013.01)
(58) Field of Classification Search
CPC ............... F03D 1/0681; F05B 2250/13; F05B 2280/6003
See application file for complete search history.

(56) References Cited

U.S. PATENT DOCUMENTS

| 11,447,666 B2* | 9/2022 | Baldini | .................... C09J 11/04 |
| 2008/0069699 A1* | 3/2008 | Bech | ................... B29C 66/1142 |
| | | | 29/889.7 |

(Continued)

FOREIGN PATENT DOCUMENTS

| CA | 3176345 A1 | 12/2021 |
| EP | 1786617 A1 | 5/2007 |

(Continued)

OTHER PUBLICATIONS

Danish Patent and Trademark Office, technical examination issued in corresponding DK Application No. PA 2021 70649, dated May 25, 2022.

(Continued)

*Primary Examiner* — Brian Christopher Delrue
(74) *Attorney, Agent, or Firm* — Wood Herron & Evans LLP (57) ABSTRACT

According to the present invention there is provided a wind turbine blade extending in a spanwise direction between a root and a tip, and in a chordwise direction between a leading edge and a trailing edge. The wind turbine blade has a spar cap comprising a plurality of strips of fibrous composite material. Each strip extends in the spanwise direction between a first end and a second end to define a length of the strip, and each strip has a width and a thickness, the width being less than the length, and the thickness being less than the width. Each strip has upper and lower major surfaces defined by the length and width dimensions. Each strip has side surfaces defined by the length and thickness dimensions. The plurality of strips includes a first strip and a second strip. The first strip has a tapered end portion in which the thickness of the first strip decreases towards the first end of the first strip. The tapered end portion defines a tapered end face inclined with respect to the upper and lower major surfaces of the first strip. The first and second strips (Continued)

are bonded together such that the first end of the first strip meets the upper or lower major surface of the second strip to define an interface between the first and second strips. The spar cap further comprises a patch arranged across the interface. The patch comprises a stack of fibrous plies.

15 Claims, 5 Drawing Sheets

(56) References Cited

U.S. PATENT DOCUMENTS

| | | | |
|---|---|---|---|
| 2008/0145615 A1* | 6/2008 | Jacobsen | B32B 3/02 |
| | | | 83/869 |
| 2008/0181781 A1* | 7/2008 | Livingston | F03D 1/0675 |
| | | | 416/223 R |
| 2020/0300216 A1* | 9/2020 | Girolamo | F03D 1/0675 |
| 2020/0408189 A1* | 12/2020 | Pal | F01D 5/282 |
| 2021/0404443 A1* | 12/2021 | Thwaites | F03D 1/0675 |
| 2023/0071090 A1* | 3/2023 | Razeghi | B29C 70/52 |
| 2023/0166472 A1* | 6/2023 | Hanrahan | B29D 99/0028 |
| | | | 416/229 R |

FOREIGN PATENT DOCUMENTS

| | | |
|---|---|---|
| EP | 2791500 A1 | 10/2014 |
| EP | 2815861 A1 | 12/2014 |
| EP | 3098062 A1 | 11/2016 |
| EP | 3712424 A1 | 9/2020 |
| EP | 3884157 A1 | 9/2021 |
| WO | 200615598 A1 | 2/2006 |
| WO | 2012000518 A2 | 1/2012 |
| WO | 2013087078 A1 | 6/2013 |
| WO | 2020103990 A1 | 5/2020 |

OTHER PUBLICATIONS

International Searching Authority, International Search Report and Written Opinion issued in corresponding PCT Application No. PCT/DK2022/050292, dated Mar. 30, 2023.
Introduction to Composite Materials Design, p. 16, sections 2.1 Fiber Reinforcements and 2.1.1 Fiber Types, 1 page.
Structural Design of Polymer Composites, pp. 8-9.

* cited by examiner

Detail view B

WIND TURBINE BLADE

TECHNICAL FIELD

The present invention relates generally to wind turbine blades and more specifically to a wind turbine blade comprising an interface between two spar cap strips.

BACKGROUND

Wind turbine blades typically comprise an outer shell and a longitudinally-extending spar structure configured to support the shell in use. A spar structure may comprise one or more longitudinally-extending spar caps configured to take up bending loads along the length of the blade. A spar cap may be formed of a plurality of strips which are bonded together.

For example, the strips may be arranged in a stack, and adjacent strips in the stack may be bonded together. The spar cap may taper in thickness along its length, and such a tapering thickness may be achieved by staggering the ends of adjacent strips in the stack. The thickness of an end portion of each staggered strip may be tapered to minimise stress concentrations at the end of the respective strip and to ensure that loads are transferred gradually between adjacent strips.

In some other examples, two spar cap strips may be aligned longitudinally and bonded together. For example, each spar cap strip may be associated with a different module of a modular blade, and the strips may be bonded together when the modular blade is assembled. In such examples, interfacing end portions of the strips may also be tapered to form a scarf joint. The tapered end portions of the strips in such an example also minimise stress concentrations and facilitate a gradual transfer of loads across the joint.

Whilst tapered spar cap strips may be advantageous for load transfer considerations, tapering the thickness of such strips can also introduce other challenges. For example, the tapered end portions of the strips are preferably as thin as possible for advantageous load transfer in the longitudinal (i.e. spanwise) direction of the blade. However, the thin tapered end portions of the strips may cause the interface between the strips to be particularly susceptible to peel loads resulting from bending loads experienced by the blade in use. Peel loads act to separate or peel the tapered end of a strip from the other strip to which it is bonded. Additionally there are typically very high shear loads in the interface between strips at the tapered end of a strip.

It is against this background that the present invention has been devised.

SUMMARY

According to the present invention there is provided a wind turbine blade extending in a spanwise direction between a root and a tip, and in a chordwise direction between a leading edge and a trailing edge. The wind turbine blade has a spar cap comprising a plurality of strips of fibrous composite material. Each strip extends in the spanwise direction between a first end and a second end to define a length of the strip, and each strip has a width and a thickness, the width being less than the length, and the thickness being less than the width. Each strip has upper and lower major surfaces defined by the length and width dimensions. Each strip has side surfaces defined by the length and thickness dimensions. The plurality of strips includes a first strip and a second strip. The first strip has a tapered end portion in which the thickness of the first strip decreases towards the first end of the first strip. The tapered end portion defines a tapered end face inclined with respect to the upper and lower major surfaces of the first strip. The first and second strips are bonded together such that the first end of the first strip meets the upper or lower major surface of the second strip to define an interface between the first and second strips. The spar cap further comprises a patch arranged across the interface. The patch comprises a stack of fibrous plies.

The spar cap preferably comprises a stack of strips. The strips are preferably pre-cured strips. The strips are preferably formed in a pultrusion process and may therefore be referred to as 'pultrusions'. Pultrusion processes have high repeatable and may therefore be used to form substantially uniform strips. The strips are preferably formed of carbon fibre reinforced polymer (CFRP). However, the strips may additionally or alternatively comprise other suitable reinforcing fibres, for example glass fibres or aramid fibres. Preferably a majority of the fibres in the strips are unidirectional fibres extending in the spanwise direction. Spanwise extending unidirectional fibres may have a high tensile strength and advantageously provide the spar cap with rigidity to resist and transfer bending loads experienced by the wind turbine blade in use.

The term 'patch plies' is used herein to refer to the fibrous plies of the patch. The patch plies preferably comprise glass fibres. The patch is preferably formed of glass fibre reinforced polymer (GFRP). GFRP provides an advantageous compromise between strength, weight, and cost, and facilitates a tailored arrangement of reinforcing fibres in the patch for advantageous structural performance.

The patch plies preferably comprise fibres extending in the spanwise direction. Fibres extending in the spanwise direction provide increased rigidity and may advantageously help to resist peel loads that act to peel the tapered end portion of the first strip from the second strip at the interface between the strips. Additionally or alternatively, the patch plies may comprise multi-axial fibres. Plies comprising multi-axial fibres may provide strength to resist loading in a plurality of directions. However, in preferred examples a majority of the fibres of the patch plies may be unidirectional fibres. Unidirectional fibres in the patch preferably extend in the spanwise direction of the blade. Spanwise extending unidirectional fibres in the patch are particularly effective for increasing the strength and rigidity of the patch to resist bending loads and peel loads at the interface. Additionally, such spanwise extending unidirectional fibres may improve the shear strength of the patch to help resist spanwise shear loads at the interface between the first and second strip.

The patch is arranged across the interface between the first and second strips. At the interface between the strips, the patch is not interleaved between the first and second strips and this helps to resist peel loads that act to peel the tapered end portion of the first strip from the second strip. In other words, the patch is not sandwiched between the first and second strips.

The patch may be a preform in which the patch plies are connected together prior to the patch being arranged across the interface. Such a configuration may facilitate an improved, i.e. faster and simpler, method of making the wind turbine blade. For example, the patch plies are preferably connected together by stitching. In preferred examples, the patch plies may be connected together by one or more lines of stitches extending in the spanwise direction. The or each line of stitches may extend substantially through the middle of the patch. Alternatively, the plies may be connected by any other suitable connection means, for example by adhesive or mechanical fasteners, such as staples.

The patch plies may be staggered in the spanwise direction. Preferably, each ply may be staggered with respect to its adjacent plies in the stack. As such, the patch preferably tapers in thickness along its spanwise length. For example, the patch may comprise a first tapered end portion arranged on a portion of the first strip. The patch may further comprise a second tapered end portion arranged on a portion of the second strip. Preferably the thickness of the patch is greatest at, or near to, the interface between the first and second strips. The tapering thickness of the patch advantageously facilitates a gradual transfer of load into the patch from one of the first or second strips in use, and may similarly facilitate a gradual transfer of load from the patch to the other of the first or second strip in use. In particular, the staggered configuration of the plies results in a tapering thickness which minimises stress concentrations at the interface between the first and second strips.

In preferred examples, edges of adjacent patch plies may be staggered in the chordwise direction. Such a configuration further minimises stress concentrations at the interface between the first and second strips, and helps to ensure that loads are gradually transferred into and out of the patch. Particularly advantageously, a tapering patch thickness resulting from patch plies staggered in the spanwise direction and/or from edges of adjacent patch plies staggered in the chordwise direction may avoid a sudden step change in patch thickness, the patch thickness changing incrementally instead. As such, any additional layers of blade material extending over the first and second strips and over the patch, do not experience a sudden step change in thickness, thereby avoiding kinks and/or stress concentrations in the additional layer(s).

The patch plies may all be substantially the same shape and size. As such, the plies may be simple and cost-effective to manufacture. In some examples, the patch plies may be shaped as trapeziums. A trapezium shape may advantageously distribute loads within the patch and help avoid stress concentrations. Preferably the patch plies may be shaped as isosceles trapeziums, in which opposed non-parallel edges of each ply are of substantially equal length. Patch plies having a trapezium shape may be particularly advantageous in examples where the patch plies are staggered in the spanwise direction. Staggering a plurality of trapezium shaped plies in the spanwise direction naturally results in the edges of adjacent plies also being staggered in the chordwise direction. As such, patch plies having a single size and shape, i.e. patch plies that are all substantially the same shape and size, can be used to form a patch that tapers in thickness along its spanwise length and across its chordwise width, simply by staggering the plies in the spanwise direction.

In preferred examples, a width of the patch in the chordwise direction may be greater than the width of the first and second strips. A width in the chordwise direction may be referred to as a chordwise width. A patch with a chordwise width greater than the width of the first and second strips may advantageously ensure that peel loads are resisted across the whole width of the interface between the first and second strips. A patch having a greater chordwise width may also have a greater cross-sectional area over which to distribute loads transferred into the patch from the first and/or second strip.

In preferred examples, a length of the patch in the spanwise direction may be significantly less than the length of the first or second strips. A length in the spanwise direction may be referred to as a spanwise length. For example, the patch preferably has a spanwise length that is less than 2% of the spanwise length of the spar cap. Providing a patch with a spanwise length substantially less than the length of the first or second strips may facilitate easier handling and application of the patch to the interface between the strips.

The thickness of the patch plies is preferably significantly less than the thickness of the first and second strips. For example, the thickness of the patch plies may be less than 20% of the thickness of the first and second strips. In some examples, the patch plies may be between 0.5 mm to 0.8 mm in thickness when cured, and the strips may be approximately 5 mm in thickness when cured.

In some examples, the patch may have a similar thickness to the first and/or second strip. However, the patch preferably has a lower stiffness than the first and/or second strip.

A first part of the patch may be arranged on the upper major surface of the first strip and a second part of the patch may be arranged on the upper major surface of the second strip. Alternatively, a first part of the patch may be arranged on the lower major surface of the first strip and a second part of the patch may be arranged on the lower major surface of the second strip. As such, the patch preferably spans the interface between the first and second strips and provides a secondary load path connecting the first and second strips. The additional load path provided by the patch advantageously increases the load transfer capacity of the interface between the first and second strips, in particular the patch facilitates the transfer of increased bending and shear loads at the interface between the strips.

In some examples the second strip may have a tapered end portion in which the thickness of the second strip decreases towards an end of the second strip. The tapered end portion may define a tapered end face. The tapered end face is preferably inclined with respect to the upper and lower major surfaces of the second strip.

The tapered end face of the first strip may be bonded to the tapered end face of the second strip to form a scarf joint between the two strips. Accordingly, the first and second strips may be in the same layer of a spar cap stack. A scarf joint advantageously facilitates a gradual transfer of loads between the first and second strips and minimises stress concentrations at the ends of the strips. In preferred examples, the first and second strips may be outer layers of the spar cap, i.e. closest to an outer surface of the blade, or the first and second strips may be inner layers of the spar cap, i.e. closest to an interior of the wind turbine blade.

The scarf joint may connect the strips as part of a joint between blade modules of a modular wind turbine blade. For example, the first strip may form part of a first spar cap associated with a first blade module and the second strip may form part of a second spar cap associated with a second blade module, for example as described in WO2019120417. The patch may therefore be provided at an interface between the first and second blade modules. Alternatively, the first or second strip may be part of a spar bridge element used to connect the spar caps of two adjacent blade modules, for example as described in WO2016198075. In this case, the patch may be provided at an interface between the spar cap of a blade module and the spar bridge element. The spanwise length of the patch is preferably significantly less than a spanwise length of the spar bridge element in such examples. For example, the patch may have a spanwise length that is less than 20% of the spanwise length of the spar bridge.

With the patch arranged across the interface between the first and second strips, the joint between the strips may resemble an asymmetric double scarf joint. For example, an asymmetric double scarf joint may be formed in part by the interfacing tapered end faces of the first and second strips, and in part by the patch and an upper or lower major surface of the first or second strip. As such, the patch may advantageously provide a secondary load path for transferring loads across the interface between the first and second strips.

Providing the patch as a preform may be particularly advantageous in examples where the patch is arranged across the interface between strips in a joint between blade modules of a modular wind turbine blade. In such an example, where the first and second strips are bonded together on-site, i.e. at a wind farm location, providing the patch as a preform may facilitate an easier, faster, and more robust process for assembling the modular wind turbine blade.

In some other examples, the first and second strips may be stacked on top of one another. For example, the lower major surface of the first strip may be bonded to the upper major surface of the second strip, or the upper major surface of the first strip may be bonded to the lower major surface of the second strip. The first and second strips may be bonded together with resin in an infusion and subsequent curing process.

The patch may be used to provide additional reinforcement at so-called 'drop-offs' in a spar cap stack. It is common for spar caps to taper in thickness gradually towards one or both ends, for example near the root of the blade and/or near the tip of the blade. This may be achieved by the ends of stacked strips terminating at different spanwise positions, such that the ends of subjacent strips in the stack are staggered successively in the spanwise direction. These staggered terminations are referred to as 'drop offs'. The patch may be applied at a drop off between the first and second strips.

Accordingly, a first part of the patch may be arranged on the tapered end face of the first strip and a second part of the patch may be arranged on the upper or lower major surface of the second strip. Arranging a patch in this way advantageously helps to resist peel loads that act to separate the tapered end portion of the first strip from the upper or lower major surface of the second strip in use.

The wind turbine blade may further comprise one or more glass-fibre layers extending over the first and second strips and over the patch. The glass-fibre layer(s) preferably completely cover the first and second strips and the patch. For example, the glass-fibre layer(s) may comprise one or more layers forming part of an inner or outer skin of the wind turbine blade.

BRIEF DESCRIPTION OF THE DRAWINGS

Examples of the present invention will now be described by way of non-limiting example only, with reference to the accompanying figures, in which.

DETAILED DESCRIPTION

Figure 1A:
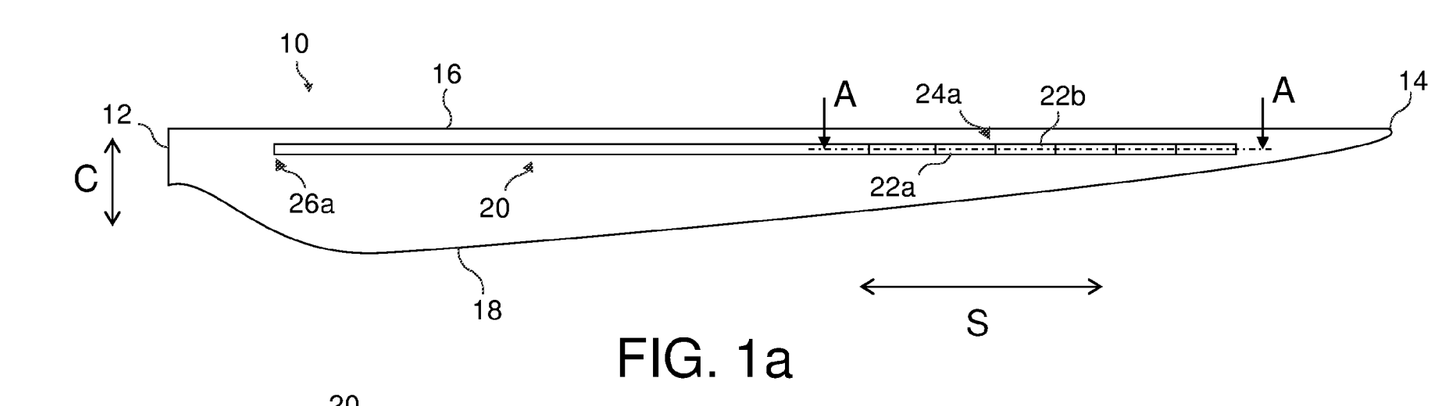
FIG. 1a is a schematic plan view of a wind turbine blade.

FIG. 1a is a schematic plan view of a wind turbine blade 10. The wind turbine blade 10 extends in a spanwise direction (S) between a blade root 12 and a blade tip 14, and in a chordwise direction (C) between a leading edge 16 and a trailing edge 18. The wind turbine blade 10 includes a spar cap 20 configured to take up and transfer bending loads experienced by the blade 10 in use.

Figure 1B:
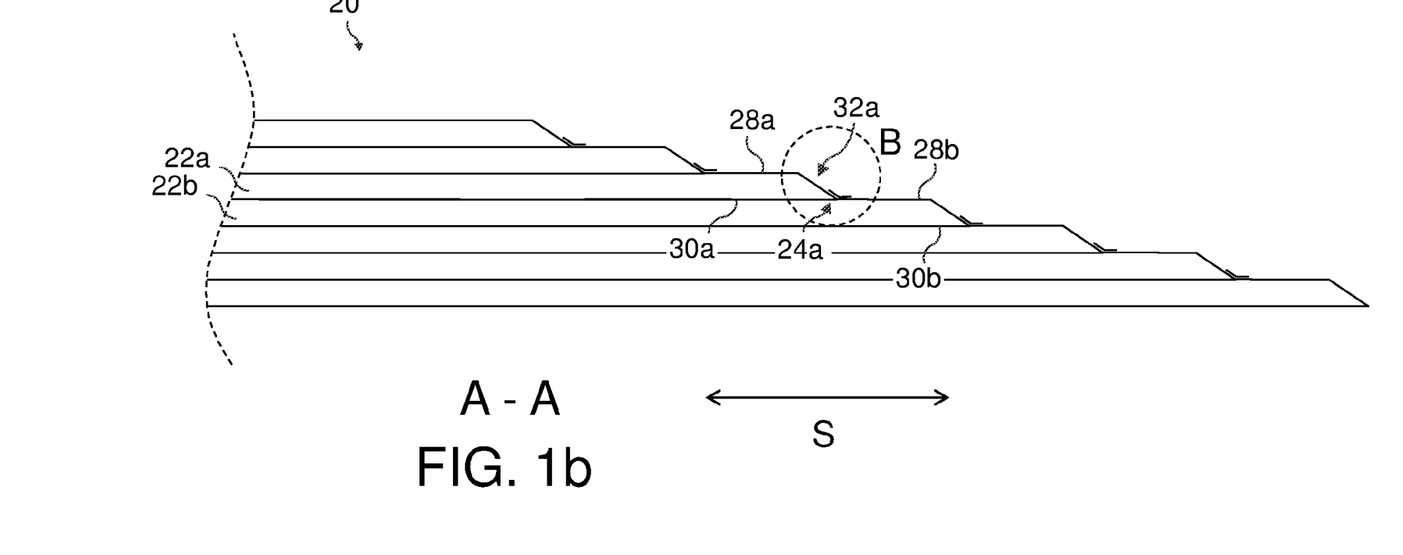
FIG. 1b is a schematic cross-sectional view of a portion of a spar cap of the wind turbine blade comprising a plurality of strips.
Figure 1C:
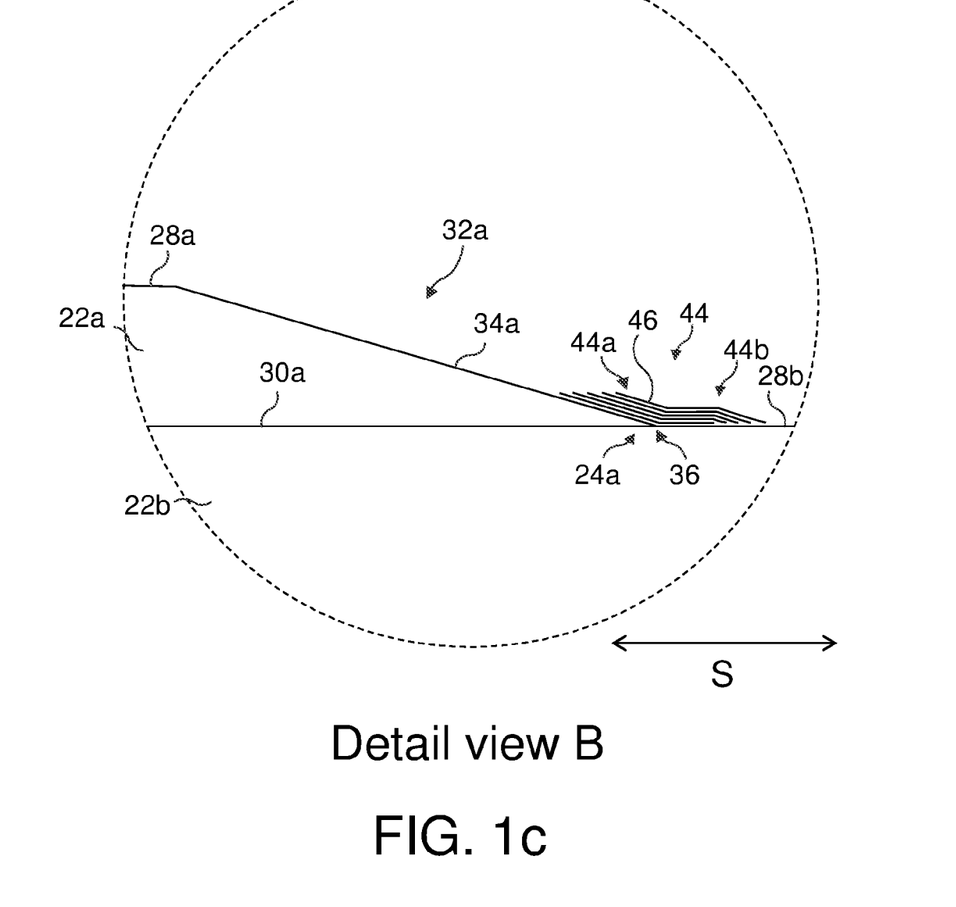
FIG. 1c is a detail view of a tapered end portion of a spar cap strip.

The spar cap 20 comprises a plurality of strips 22 of fibrous composite material as shown more clearly in the cross-sectional view of FIG. 1b and the detail view of FIG. 1c. Each spar cap strip 22 extends in the spanwise direction (S) between a first end 24 and a second end 26 to define a length, i.e. a spanwise length, of the strip 22. Each strip 22 also has a width, i.e. a chordwise width, and a thickness, where the thickness is orthogonal to both the length and width of the strip. The width of each strip 22 is less than the length of the strip 22, and the thickness of each strip 22 is less than the width of the strip 22. Each strip 22 has an upper and lower major surface 28, 30 defined by the length and width dimensions, and, whilst not shown in the cross-sectional views, each strip 22 also has side surfaces defined by the length and thickness dimensions.

Referring still to FIGS. 1b and 1c, the spar cap 20 comprises a first strip 22a and a second strip 22b which are bonded together. In some examples, the first and second strips 22a, 22b may be stacked on top of one another. To form a spar cap 20 with a tapering thickness, the strips 22 in the stack may be staggered in the spanwise direction (S). In order to minimise stress concentrations and gradually transfer loads between the adjacent strips 22, the first strip 22a has a tapered end portion 32a in which the thickness of the first strip 22a decreases towards the first end 24a of the first strip 22a. The tapered end portion 32a defines a tapered end face 34a that is inclined, i.e. angled, with respect to the upper and lower major surfaces 28a, 30a of the first strip 22a. The first end 24a of the first strip 22a meets a major surface of the second strip 22b, in this example the upper major surface 28b, to define an interface 36 between the first and second strips 22a, 22b.

Figure 2A:
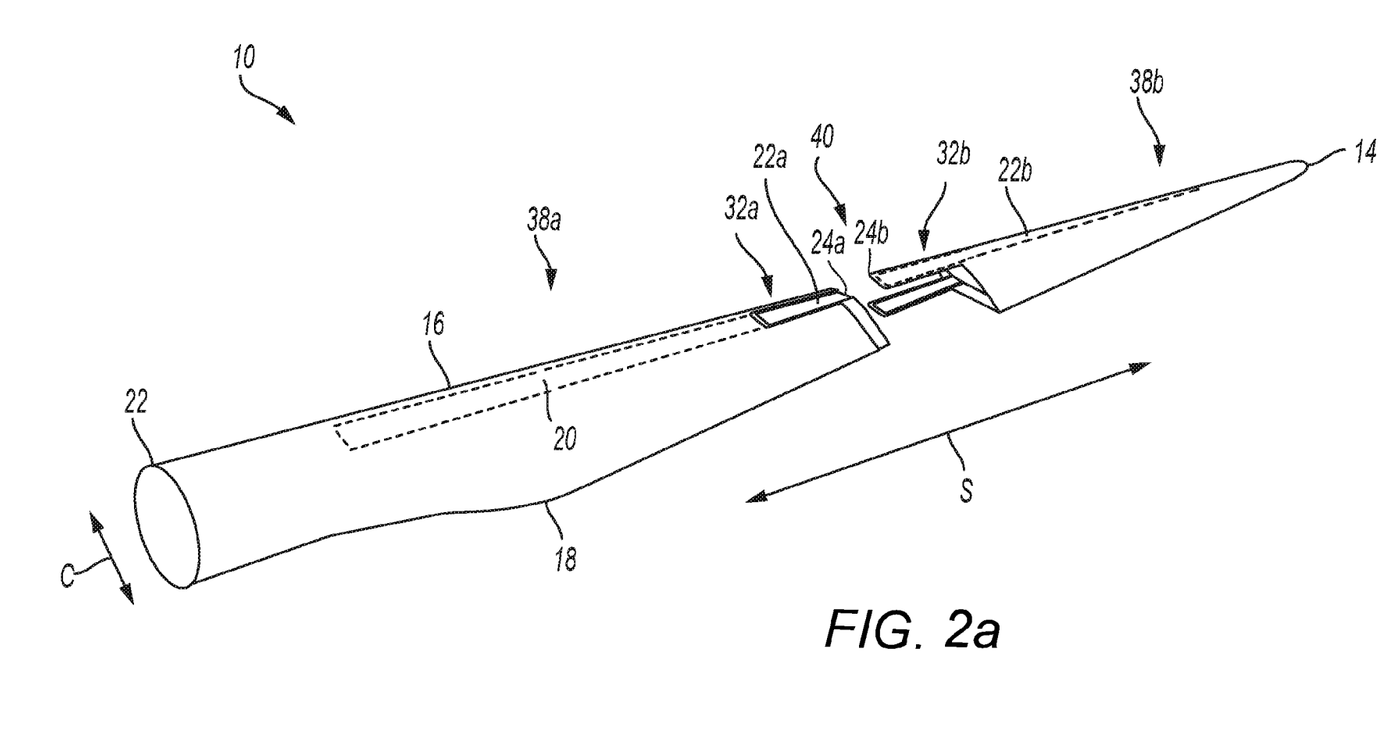
FIG. 2a is schematic exploded view of another example of a wind turbine blade.
Figures 2B, 2C:
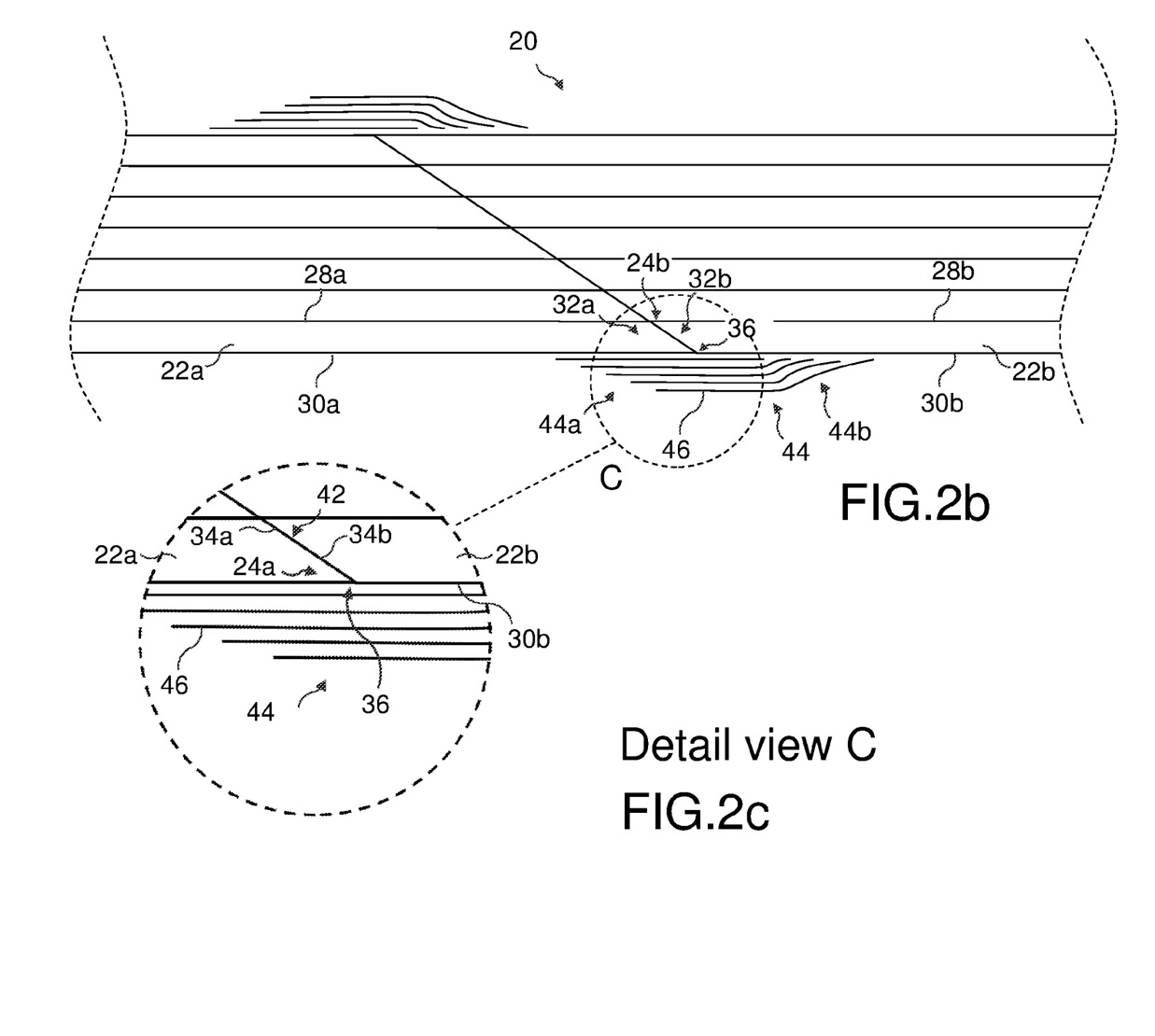
FIG. 2b is a schematic cross-sectional view of a scarf joint between a first and second strip of the spar cap.
FIG. 2c is a schematic detail view of the scarf joint shown in FIG. 2b.

With reference now to FIG. 2a, another example of a wind turbine blade 10 is shown in a schematic exploded view. FIG. 2b shows a cross-sectional view of a portion of the spar cap 20 of the blade 10, and FIG. 2c shows a detail view of a portion of the spar cap 20. Equivalent features to those previously described with reference to FIGS. 1a to 1c will not be repeated here for conciseness. However, as shown in FIGS. 2a, in some examples the blade 10 may be a modular wind turbine blade comprising blade modules 38a, 38b which are connected together at a joint 40. Preferably, the joint 40 may be formed between spar cap strips 22a, 22b associated with each blade module 38a, 38b.

Whereas the first and second spar cap strips 22a, 22b are arranged on top of one another in a stack in the example of FIGS. 1a to 1c, in some examples, the first and second strips 22a, 22b may be bonded together in the same layer of a stack. For example, with reference more particularly to FIG.

2b, the second strip 22b, to which the first strip 22a is bonded, may also have a tapered end portion 32b. As such, the thickness of the second strip 22b may decrease towards an end 24b of the second strip 22b. The tapered end portion 32b of the second strip 22b may therefore define a tapered end face 34b that is inclined with respect to the upper and lower major surfaces 28b, 30b of the second strip 22b. Accordingly, in some examples the tapered end face 34a of the first strip 22a may be bonded to the tapered end face 34b of the second strip 22b to form a scarf joint 42 between the two strips 22a, 22b. The first end 24a of the first strip 22a again meets a major surface 28b or 30b of the second strip 22b, in this example the lower major surface 30b, to define an interface 36 between the first and second strips 22a, 22b.

It will be appreciated that the schematic accompanying figures are not drawn to scale. The tapered end portion 32a, 32b of the first and/or second spar cap strip 22a, 22b may taper at a rate of approximately 1:100, i.e. 1 cm in thickness for every 100 cm in spanwise distance. In order to illustrate the examples more clearly, the tapered end portions 32a, 32b are shown with a steeper taper. However, it will be appreciated that in practice, the thin tapered ends 32a, 32b configured for advantageous load transfer, may be susceptible to peel loads in use as described by way of background.

As such, the spar cap 20 further comprises a patch 44 arranged across the interface 36 between the first and second strips 22a, 22b, as shown in FIGS. 1b, 1c and 2b for example. The patch 44 provides strength to the interface 36 and helps to resist peel loads that act to separate the first and second strips 22a, 22b in use. The patch 44 additionally helps to resist shear loads at the interface 36. The patch 44 comprises a stack of fibrous plies 46, such as glass fibre plies, and will now be described in more detail with reference to FIG. 3.

Figure 3:
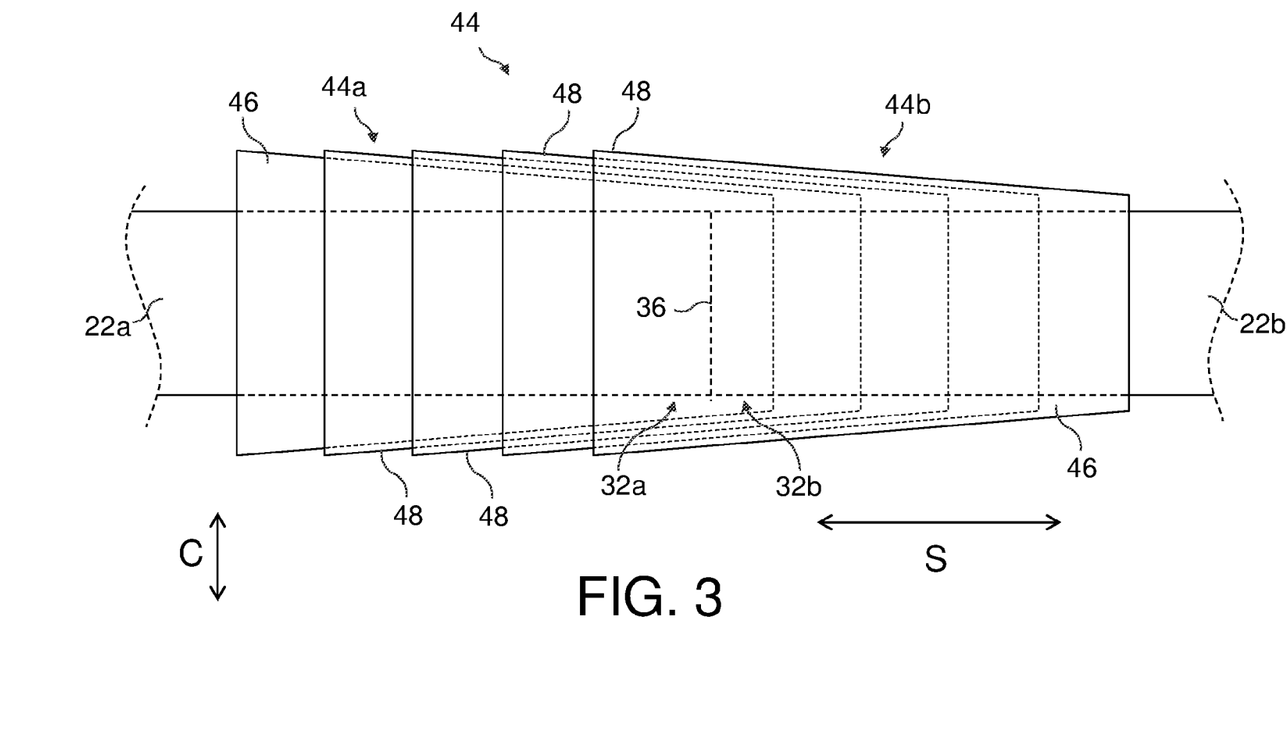
FIG. 3 is a schematic plan view of a patch arranged across an interface between first and second strips of the spar cap.

The patch 44 shown in the schematic plan view of FIG. 3 may be arranged across an interface 36 between first and second staggered strips 22a, 22b in a stack, as shown in FIG. 1b for example, or the patch 44 may be arranged across an interface 36 between first and second strips 22a, 22b that form a scarf joint 42, as shown in FIG. 2b for example. As such, the following description of the patch 44, interface 36, and strips 22a, 22b applies equally to each of the previously described examples.

The fibrous plies 46 in the patch 44 may be referred to herein as patch plies 46. The patch plies 46 may comprise fibres extending in the spanwise direction (S) and/or multi-axial fibres. In preferred examples, one or more of the patch plies 46 may comprise spanwise extending unidirectional fibres to increase the strength of the patch 44 to resist bending loads in use, and to thereby also help resist peel loads and shear loads that act to separate the ends 32a, 32b of the strips 22a, 22b.

In some examples, as shown in FIG. 1c, a first part 44a of the patch 44 may be arranged on the tapered end face 34a of the first strip 22a and a second part 44b of the patch 44 may be arranged on the upper or lower major surface 28b, 30b of the second strip 22b. Alternatively, and as shown in FIG. 2b for example, a first part 44a of the patch 44 may be arranged on the upper or lower major surface 28a, 30a of the first strip 22a, and a second part 44b of the patch 44 may be arranged similarly on the upper or lower major surface 28b, 30b of the second strip 22b. As such, in each example the patch 44 spans the interface 36 between the first and second strips 22a, 22b. Accordingly the patch 44 provides a secondary load path for transferring loads between the first and second strips 22a, 22b of the spar cap 20.

As shown in FIGS. 1b and 2b as well as FIG. 3, the patch plies 46 may be staggered in the spanwise direction (S) in preferred examples. As most clearly shown in the cross-sectional views of FIGS. 1b and 2b, staggering the plies 46 in the spanwise direction (S) results in a patch 44 having a tapered thickness. As such, the patch 44 may be configured to receive loads gradually from one of the strips 22, and subsequently transfer the loads gradually from the patch 44 to the other strip 22, thereby reducing the risk of stress concentrations and faults near the interface 36. In some examples, as shown most clearly in FIG. 3, edges 48 of adjacent patch plies 46 may be staggered in the chordwise direction (C) to similarly distribute loads and reduce stress concentrations in the patch 44.

Referring still to FIGS. 1b and 2b, the thickness of each patch ply 46 is preferably significantly less than the thickness of the first and second strips 22a, 22b. As such, the patch plies 46 are preferably configured to only take up a small proportion of the loads transferred between the first and second strips 22a, 22b, with the thicker spar cap strips 22a, 22b being configured to take up and transfer a majority of the load. As such, the patch 44 is preferably configured to provide a secondary load path, whilst the main load path for transferring loads remains between the first and second spar cap strips 22a, 22b.

Further the patch 44 is preferably configured with a spanwise length significantly less than the length of the first or second strips 22a, 22b. Such a configuration simplifies arrangement of the patch 44 across the interface 36. In some examples, the patch 44 may be a preform in which the patch plies 46 are connected together prior to the patch 44 being arranged across the interface 36. Again, such a configuration further facilitates a simple arrangement of the patch 44 across the interface 36 between the first and second spar cap strips 22a, 22b, and may help to ensure the patch plies 46 are accurately aligned relative to one another.

With reference again to FIG. 3, a chordwise width of the patch 44 may be greater than the chordwise width of the first and second strips 22a, 22b. This helps to ensure that peel loads are resisted across the full width of the interface 36, thereby providing a robust connection between the first and second spar cap strips 22a, 22b.

The patch plies 46 may be substantially the same shape and size. In some examples, as shown in FIG. 3, the patch plies 46 may be shaped as trapeziums to help distribute loads in the patch 44 and avoid stress concentrations. Whilst not shown in the accompanying figures, in some examples the blade 10 may comprise one or more glass-fibre layers extending over the first and second strips 22a, 22b and over the patch 44. For example, the glass-fibre layer, or layers, may completely cover the first and second strips 22a, 22b and the patch 44. Staggering the patch plies 46 in the spanwise direction (S), and/or staggering edges 48 of adjacent patch plies 46 in the chordwise direction (C) is particularly beneficial in such examples. The staggered patch plies 46 form a patch 44 having a tapering thickness, i.e. a thickness that changes incrementally, which helps to ensure that additional layers extending over the first and second strips 22a, 22b and over the patch 44, do not experience a sudden step change in thickness, thereby avoiding kinks and/or stress concentrations in the additional layer(s).

Further, it will be appreciated that the above description and accompanying figures are provided merely as an example of the present invention. Many alternatives to the specific examples described above are therefore possible without departing from the scope of the invention as defined in the appended claims.

For example, it will be appreciated that whilst the description of a scarf joint 42 formed between the first and second strips 22a, 22b has been provided above in the context of a joint 40 between two blade modules 38a, 38b, in some examples a wind turbine blade 10 may comprise a scarf joint 42 between first and second strips 22a, 22b of the spar cap 20 without the scarf joint 42 necessarily being part of a joint 40 between two blade modules 38a, 38b. For example, the spar cap 20 may comprise a scarf joint 42 between two shorter spar cap strips 22a, 22b that are bonded together at a scarf joint 42 to form a spar cap 20 having the requisite length.

It will be appreciated that the description provided above serves to demonstrate a plurality of possible examples of the present invention. Features described in relation to any of the examples above may be readily combined with any other features described with reference to different examples without departing from the scope of the invention as defined in the appended claims.

The invention claimed is:

1. A wind turbine blade extending in a spanwise direction between a root and a tip, and in a chordwise direction between a leading edge and a trailing edge, the wind turbine blade having a spar cap comprising a plurality of strips of fibrous composite material,
   each strip extending in the spanwise direction between a first end and a second end to define a length of the strip,
   each strip having a width and a thickness, the width being less than the length, and the thickness being less than the width,
   each strip having upper and lower major surfaces defined by the length and width dimensions, and side surfaces defined by the length and thickness dimensions;
   the plurality of strips including a first strip and a second strip,
   the first strip having a tapered end portion in which the thickness of the first strip decreases towards the first end of the first strip, the tapered end portion defining a tapered end face inclined with respect to the upper and lower major surfaces of the first strip;
   the first and second strips being bonded together such that the first end of the first strip meets the upper or lower major surface of the second strip to define an interface between the first and second strips;
   wherein the spar cap further comprises a patch arranged across the interface, the patch comprising a stack of patch plies.

2. The wind turbine blade of claim 1, wherein the patch plies comprise fibres extending in the spanwise direction and/or multi-axial fibres.

3. The wind turbine blade of claim 1, wherein the patch is a preform in which the patch plies are connected together prior to the patch being arranged across the interface.

4. The wind turbine blade of claim 1, wherein the patch plies are staggered in the spanwise direction.

5. The wind turbine blade of claim 1, wherein edges of adjacent patch plies are staggered in the chordwise direction.

6. The wind turbine blade of claim 1, wherein the patch plies are all the same shape and size.

7. The wind turbine blade of claim 1, wherein the patch plies are shaped as trapeziums.

8. The wind turbine blade of claim 1, wherein a width of the patch in the chordwise direction is greater than the width of the first and second strips.

9. The wind turbine blade of claim 1, wherein a length of the patch in the spanwise direction is less than the length of the first or second strips.

10. The wind turbine blade of claim 1, wherein the thickness of the patch plies is less than the thickness of the first and second strips.

11. The wind turbine blade of claim 1, wherein a first part of the patch is arranged on the upper major surface of the first strip and a second part of the patch is arranged on the upper major surface of the second strip, or wherein a first part of the patch is arranged on the lower major surface of the first strip and a second part of the patch is arranged on the lower major surface of the second strip.

12. The wind turbine blade of claim 1, wherein the second strip has a tapered end portion in which the thickness of the second strip decreases towards an end of the second strip, the tapered end portion defining a tapered end face inclined with respect to the upper and lower major surfaces of the second strip.

13. The wind turbine blade of claim 12, wherein the tapered end face of the first strip is bonded to the tapered end face of the second strip to form a scarf joint between the two strips.

14. The wind turbine blade of claim 1, wherein the first and second strips are stacked on top of one another.

15. The wind turbine blade of claim 14, wherein a first part of the patch is arranged on the tapered end face of the first strip and a second part of the patch is arranged on the upper or lower major surface of the second strip.

* * * * *